United States Patent [19]

Cochran et al.

[11] Patent Number: 4,573,757

[45] Date of Patent: Mar. 4, 1986

[54] TRANSFORMER BUSHING

[75] Inventors: John P. Cochran, Charlotte, N.C.; Herbert J. Macemon, Versailles, Ky.

[73] Assignee: Kuhlman Corporation, Troy, Mich.

[21] Appl. No.: 707,178

[22] Filed: Mar. 1, 1985

Related U.S. Application Data

[63] Continuation of Ser. No. 561,990, Dec. 14, 1983, abandoned, which is a continuation of Ser. No. 182,232, Aug. 28, 1980, abandoned.

[51] Int. Cl.[4] .................. H02B 1/02

[52] U.S. Cl. .................. 339/126 RS; 174/152 A

[58] Field of Search .................. 339/126 R, 126 RS, 129, 339/94 R, 94 A; 174/152, 153

[56] References Cited

U.S. PATENT DOCUMENTS

| | | | |
|---|---|---|---|
| 728,092 | 5/1903 | Edwards | 339/114 |
| 1,064,920 | 6/1913 | Lovejoy | 174/87 |
| 1,247,356 | 11/1917 | Wooden | 411/386 |
| 1,274,844 | 8/1918 | Berg | 339/159 R |
| 1,859,767 | 5/1932 | Dowick | 81/3.8 |
| 1,928,157 | 9/1933 | Levin | 339/97 R |
| 1,957,982 | 5/1934 | Smith . | |
| 1,961,608 | 6/1934 | Gakle et al. | 361/132 |
| 2,000,732 | 5/1935 | Zelt . | |
| 2,029,140 | 1/1936 | Treanor | 174/18 |
| 2,069,239 | 2/1937 | Fraser | 362/226 |
| 2,104,108 | 1/1938 | Webb | 174/153 R |
| 2,270,807 | 1/1942 | Johnson | 339/246 |
| 2,387,630 | 10/1945 | Weakley | 174/152 R |
| 2,405,425 | 8/1946 | Higgins . | |
| 2,532,625 | 12/1950 | Kieser | 339/269 |
| 2,564,181 | 8/1951 | Van Ryan | 174/152 R |
| 2,651,672 | 9/1953 | Ivanoff . | |
| 2,664,457 | 12/1953 | Joublanc | 174/153 R |
| 2,728,810 | 12/1955 | Ziehr | 174/75 R |
| 2,740,100 | 3/1956 | Broverman | 339/202 |
| 2,770,669 | 11/1956 | Smith | 174/152 R |
| 2,866,173 | 12/1958 | Newcombe | 339/202 |
| 2,881,125 | 4/1959 | Waterman . | |
| 2,883,640 | 4/1959 | Duenke | 339/202 |
| 2,919,300 | 12/1959 | Carlson . | |
| 2,927,809 | 3/1960 | Smelko | 403/197 |
| 2,934,593 | 4/1960 | Kollinger | 174/145 |
| 2,990,528 | 6/1961 | Zimsky et al. | 336/58 |
| 3,054,850 | 9/1962 | Dulude | 174/145 |
| 3,073,891 | 1/1963 | Barengoltz | 174/161 R |
| 3,077,513 | 2/1963 | Felts . | |
| 3,150,230 | 9/1964 | Goodman | 174/59 |
| 3,200,366 | 8/1965 | Stuart . | |
| 3,314,030 | 4/1967 | Mallett et al. | 336/58 |
| 3,349,365 | 10/1967 | Dozier | 339/254 R |
| 3,363,219 | 1/1968 | Hubbard et al. | 339/95 A |
| 3,376,541 | 4/1968 | Link . | |
| 3,414,868 | 12/1968 | Howe | 339/116 R |
| 3,422,392 | 1/1969 | Woods | 339/129 |
| 3,433,893 | 3/1969 | Hofmann et al. . | |
| 3,462,645 | 8/1969 | Leonard | 339/126 R X |
| 3,469,223 | 9/1969 | Leonard | 337/202 |
| 3,474,369 | 10/1969 | Keogh . | |
| 3,475,693 | 10/1969 | Ristuccia . | |
| 3,509,516 | 4/1970 | Phillips | 339/94 C |
| 3,617,986 | 11/1971 | Becker et al. | 339/94 A |
| 3,740,685 | 6/1973 | Fisher | 336/142 |
| 3,801,727 | 4/1974 | Wilkinson et al. . | |
| 3,909,509 | 9/1975 | Fisher | 174/152 R |
| 4,059,329 | 11/1977 | Macemon | 339/94 A X |

FOREIGN PATENT DOCUMENTS

| | | |
|---|---|---|
| 565677 | 11/1958 | Canada . |
| 967667 | 3/1950 | France . |
| 37998 | 1/1914 | Sweden . |
| 180802 | 6/1922 | United Kingdom . |
| 985003 | 3/1965 | United Kingdom . |
| 1024525 | 3/1966 | United Kingdom . |
| 1047764 | 11/1966 | United Kingdom . |

*Primary Examiner*—Eugene F. Desmond

*Attorney, Agent, or Firm*—Harness, Dickey & Pierce

[57] ABSTRACT

This disclosure relates to a bushing assembly for use with tank-type electrical transformers. The bushing uses a maximum amount of conductor material to provide the required shape and the necessary physical strength, and uses a minimum amount of insulating material to provide only the insulating function. The bushing may be secured to the wall of the transformer tank by an externally mating clamp assembly, or may include threads formed on the inside portion of the bushing for engaging an internally threaded securing member.

18 Claims, 8 Drawing Figures

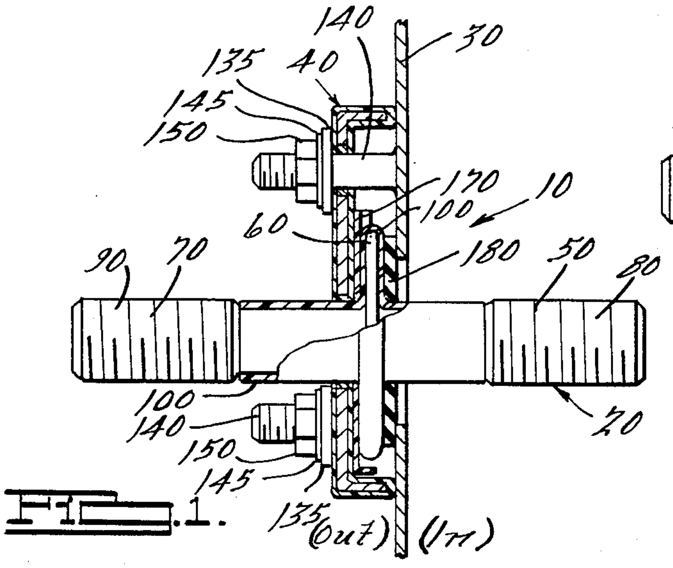
FIG. 1.
FIG. 2.
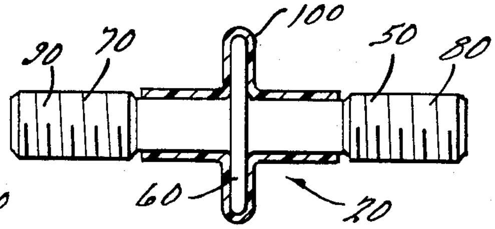
FIG. 3.
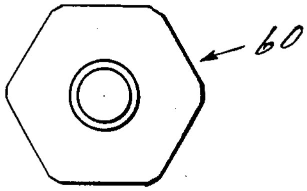
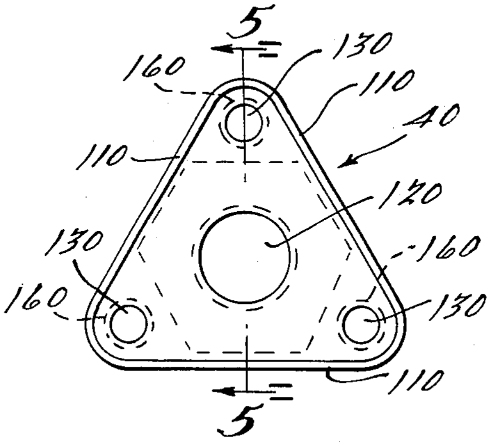
FIG. 4.
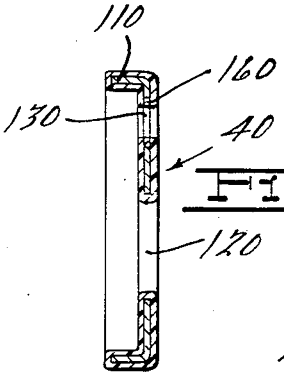
FIG. 5.
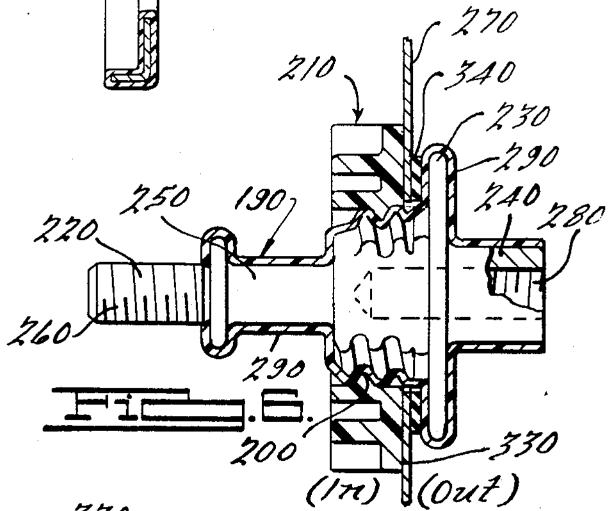
FIG. 6.
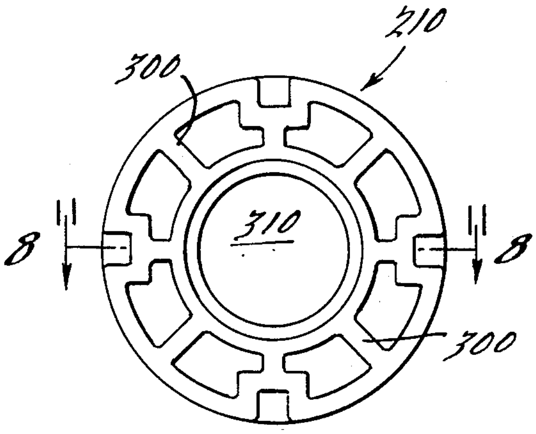
FIG. 7.
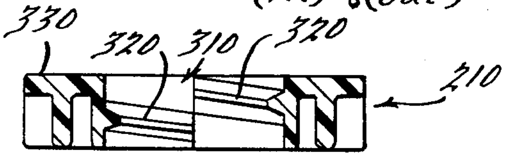
FIG. 8.

TRANSFORMER BUSHING

This application is a continuation of application Ser. No. 561,990, filed Dec. 14, 1983, now abandoned, which was continuation of application Ser. No. 182,232, filed Aug. 28, 1980, now abandoned.

BACKGROUND AND SUMMARY OF THE INVENTION

This invention relates generally to electrical connectors, and more particularly to bushings or connectors for use with tank-type electrical transformers.

Bushings or connectors currently used with tank-type electrical transformers, such as those known as low voltage bushings, generally comprise multi-piece assemblies made up of a molded epoxy bushing and associated conductor elements. Such an epoxy bushing is normally of an appropriate cross-section and size to meet mounting requirements, while the associated conductor normally extends through the epoxy bushing and usually includes specially-shaped end portions such as spade terminals, eyebolt connectors, or the like. Such an insulating epoxy molded bushing, however, in addition to providing insulative properties, also has been required to provide mechanical and structural properties since it is the primary means of securing the bushing or connector assembly to the tank wall. Thus it has been necessary to manufacture such epoxy bushings in elaborate shapes, using relatively expensive epoxy molding compounds, while still providing adequate structural strength. Needless to say, in many cases this delicate balance has proven to be very difficult to achieve.

Accordingly, it is a principal object of the present invention to provide an improved transformer bushing which in addition to furnishing the requisite conductive and insulative properties, does so by using a minimum amount of insulating material, that is, only that amount necessary to provide the insulative properties. Thus a more reliable bushing may be provided wherein the conducting material, rather than the more fragile insulating material, furnishes the required mechanical and structural properties.

In general, the transformer bushing assembly according to the present invention comprises a conducting member which provides the required shape and necessary mechanical and structural strength, and an insulating layer which is used only to provide the necessary insulating properties. The bushing assembly is made primarily, although not exclusively, for use with tank-type electrical transformers and is adapted to be inserted through an opening of predetermined cross-sectional dimension in the wall of the tank to provide electrical connection of the transformer with an external conductor. The bushing assembly is comprised of a conductor adapted to extend through the opening in the tank wall having a first connector portion for providing an electrical connection to the transformer, a second connector portion for providing an electrical connection to the external conductor, and a securing portion having a cross-sectional dimension greater than the predetermined cross-sectional dimension of the opening in the tank wall, for securing the bushing assembly to the wall of the tank. The bushing assembly further comprises a coating of dielectric material on the securing portion, which may be of substantially uniform thickness for insulating the conductor from electrical conduction with the wall, and securing means cooperative with the securing portion of the conductor for securing the bushing assembly to the wall, but maintaining insulation of the conductor from electrical conduction with the wall. In the two preferred embodiments described herein, the conductor may either be secured to the wall of the associated transformer tank by an externally mating clamp assembly having a similar dielectric layer thereon, or may include threads formed on its inside portion for engaging an insulated internally threaded securing member. It should of course be appreciated that these securing methods may be interchanged or modified without departing from the fair meaning of the present invention. Appropriate sealing and gasket materials are also provided.

In the one preferred embodiment described herein, the conductor includes a rod portion adapted to extend through the opening in the wall for providing a first rod end interior of the tank for connection to the transformer and a second rod end exterior of the tank for providing an electrical connection to the external conductor, and also includes a plate portion secured to the rod portion intermediate the ends thereof having a cross-sectional dimension greater than the predetermined cross-sectional dimension of the opening in the tank wall, for securing the bushing assembly to the wall of the tank. The bushing assembly further comprises a coating of dielectric material on the plate portion, which may be of substantially uniform thickness, for insulating the conductor from electrical conduction with the wall, and a clamping member having an opening therethrough for receiving one of the rod ends and being adapted to clamp the plate portion to the wall of the transformer to secure the bushing assembly to the wall but maintaining insulation of the conductor from electrical conduction with the wall.

Additional advantages and features of the present invention will become apparent from a reading of the detailed description of the preferred embodiments which makes reference to the following set of drawings in which:

BRIEF DESCRIPTION OF THE DRAWINGS

FIG. 1 is a side elevational view, partially in section, of the transformer bushing assembly of the present invention, shown mounted on a transformer tank wall;

FIG. 2 is a side elevational view, partially in section of the conductor or bushing stud portion only of the transformer bushing assembly of FIG. 1;

FIG. 3 is an end view of the conductor or bushing stud portion of FIG. 2;

FIG. 4 is a plan view of the clamp assembly portion only of the transformer bushing assembly of FIG. 1;

FIG. 5 is a cross-sectional view of the clamp assembly portion of FIG. 4 along the line 5—5 in FIG. 4;

FIG. 6 is a longitudinal cross-sectional view of another embodiment of the transformer bushing assembly of the present invention, shown positioned on a transformer tank wall;

FIG. 7 is a plan view of an insulated threaded member adapted for use with the bushing stud portion of FIG. 6; and FIG. 8 is a cross-sectional view of the threaded member of FIG. 7 along the line 8—8 in FIG. 7.

DESCRIPTION OF THE PREFERRED EMBODIMENTS

Referring now to the drawings wherein the showings are for the purpose of illustrating two preferred embodiments of the present invention and are not for the purpose of limiting the invention, FIGS. 1 to 5 show one preferred embodiment of the bushing assembly 10 of the present invention in which the conductor or bushing stud 20 is secured to the wall 30 of the associated transformer tank by an externally mating clamp assembly 40. For the sake of reference, the inside portion of the tank is labeled "In" and typically is an oil or dielectric fluid environment, while the outside portion of the tank, which is labeled "Out" is open to air. The conductor or bushing stud 20, as shown in FIGS. 1 and 2, comprises a first connector or rod portion 50, a securing or intermediate plate portion 60, and a second connector or rod portion 70. The first connector portion is made of a conductive material and is adapted for connection to an electrical lead within the transformer. The securing portion 60 is integral with and made of the same conductive material as the first connector portion 50, but is of a larger cross-section than the first connector portion. This larger cross-section forms a shoulder or rim in about the center of the bushing stud thus enabling the securing portion 60 to be mounted adjacent the outer casing of the associated electrical transformer. The second connector portion 70 is integral with and made of the same conductive material as both the first connector portion 50 and the securing portion 60. Like the first connector portion 50, the second connector portion 70 is of a cross-section smaller than the securing portion 60, and likewise is adapted for connection to an electrical lead, but outside the transformer. In this preferred embodiment, the first connector portion 50 and the second connector portion 70 are generally symmetrical to one another about the securing portion 60, and both connector portions are threaded on their terminal ends, 80 and 90, respectively, so as to allow for attachment of electrical leads or other connector means such as spade terminals, eyebolt connectors, or the like. This securing portion has a relatively thin (i.e., about 0.035 inches) layer of insulating material thereon, although other similar insulating layers are believed to be usable. This insulating layer is generally depicted as 100 in the drawings and insulates the conductor from electrical conduction with the wall.

As best seen in FIG. 3, the securing portion 60 is generally hexagonal in cross-sectional shape. As will be explained in more detail hereinbelow, this particular shape allows for a secure anti-rotation connection with the mating clamp assembly 40 which is placed over and mates with the securing portion 60. This shape, coupled with the symmetry of the first and second connector portions, provides a part which in addition to being able to furnish a secure clamping action, cannot be assembled incorrectly. It further allows for error-free installation since regardless of the orientation of the securing portion 60, and as will be shown below, clearance is always provided for the studs on the transformer tank.

As shown in FIGS. 1, 4 and 5, the mating clamp assembly 40 shown therein comprises a metal stamping, and like the securing portion referred to hereinabove, has a relatively thin layer of insulating material thereon. The clamp assembly 40 is generally triangular in cross-sectional shape and has integral side walls 110 which are generally perpendicular to the flat face of the clamp assembly 40 and which surround and mate with three of the six sides of the hexagonally-shaped securing portion 60. (See the dotted line in FIG. 4.) The clamp assembly 40 has a central alignment hole 120 therein for passing over and around the second connector portion, and also has three mounting holes 130 therein which are adapted for alignment with mounting studs 140 welded on the outside of the transformer tank 30. It should thus be noted that clearance will always be provided for the mounting studs and holes due to the unique hexagonal securing portion. When the clamp assembly 40 is fastened down using appropriate fastening means such as flatwashers 135, lockwashers 145, and nuts 150 on the mounting studs 140, the securing portion 60 of the conductor or bushing stud 20 of the bushing assembly 10 of the present invention is located and secured on the outside of the associated transformer tank. The clamp assembly 40 may contain brass eyelets 160 around the mounting holes 130 to provide corrosion resistance inside the holes. The three mounting holes may be used to hold the clamp assembly 40 during the coating process when the insulating layer is placed thereon. In this way, the holes are not coated on their inside diameter thus assuring as accurate hole diameter after coating. By using brass eyelets, a fully corrosion resistant part is produced at substantially lower cost than using stainless steel or the like for the entire formed part. An insulating layer such as an epoxy coating or the like on the clamp assembly 40 is required from an electrical standpoint to provide the necessary strike distance and high-potential withstand.

As shown in FIG. 1, a cushion gasket 170, preferably made of a material such as nitrile rubber or treated paper and of a thickness of about 0.020 inches, may be used to provide a slight cushion between the outer face of the coated securing portion 60 and the inner face of the coated clamp assembly 40. Such a cushion gasket 170 also significantly decreases, if not eliminates, any tendency of the coated conductor and clamp to bond together under long term compression and heat from the transformer. The cushion gasket 170 is generally triangular in shape with appropriately placed holes to accommodate the conductor, mounting studs, and holes in the mating clamp assembly, and also is formed to lay within the confines of the side walls 110 of the clamp assembly 40, thereby separating the side walls of the clamp assembly from the three mating edges of the hexagonal securing portion. In addition to the cushion gasket 170, a sealing gasket 180 is provided between the inner face of the securing portion 60 and the outer casing of the associated electrical tank 30, and preferably is made of a material such as nitrile rubber, although other similar sealing materials including other elastomeric materials are believed to be usable. This sealing gasket 180 prevents oil from leaking out of the transformer tank. It should thus be apparent that the hexagonally-shaped securing portion 60, when clamped up against the tank using the above described geometrically mating clamp assembly and gaskets, provides resistance to cantilever forces as it is held between the tank wall and the clamp, and also provides resistance to torque as it is captured within the geometrically mating formed clamp. As referred to somewhat above, this unique combination of geometric shapes also provides for error-free installation.

FIGS. 6 to 8 show another preferred embodiment of the bushing assembly of the present invention in which the conductor or bushing stud 190 includes threads 200 formed on the inside portion of the bushing for engaging an internally threaded securing member 210. As with the description given above, for the sake of reference, the inside portion of the tank is labeled "In" and typically is an oil or dielectric fluid environment, while the outside portion of the tank, which is labeled "Out" is open to air. The bushing stud 190, as shown in FIG. 6, comprises a first connector portion 220, a securing portion 230, and a second connector portion 240. As with the embodiment of FIGS. 1 to 5, the first connector portion 220 of this embodiment is made of a conductive material and is adapted for connection to an electrical lead within the transformer. This first connector portion includes the threads 200, referred to earlier, which are formed on a shank 250 connecting threads 260 on the innermost end of the first connector portion 220 to the securing portion 230. The threads 200 are of a diameter small enough to be inserted into an opening in the associated transformer tank wall 270. The securing portion 230 is integral with and made of the same conductor material as the first connector portion 220, but is of a larger cross-section than the first connector portion 220, shank 250, and threads 200. This larger cross-section forms a shoulder or rim in about the center of the bushing stud thus enabling this securing portion 230 to be mounted adjacent the outer casing or wall of the associated electrical transformer tank 270. The second connector portion 240 is integral with and made of the same conductive material as both the first connector portion 220 and the securing portion 230. Like the first connector portion 220, the second connector portion 240 is of a cross-section smaller than the securing portion, and likewise is adapted for connection to an electrical lead, but outside the transformer. In this preferred embodiment, the second connector portion has a threaded hole 280 therewithin. This offers lower cost in the complete bushing assembly, as well as flexibility in the finished transformer for interchangeability of external connections between spade terminals, eyebolt connectors, or other connection means. This securing portion has a relatively thin (i.e., about 0.035 inches) layer of insulating material thereon, although other similar insulating layers are believed to be usable. This insulating layer is generally depicted as 290 in the drawings.

Referring now to FIGS. 7 and 8, the threaded securing member 210 for use with the conductor or bushing stud 190 in the bushing assembly of the present invention is shown. This threaded securing member is made of insulating material or otherwise has insulating properties and is generally circular and nut-like in character. The threaded securing member 210 as shown in FIGS. 7 and 8 may preferably be made of conventional molded epoxy and have appropriately positioned structural supporting ribs 300 therein radiating from a threaded hole 310 in its center. Threads 320 surrounding this hole are adpated to mate with the threads 200 on the conductor or bushing stud 190. When it is desired to secure the bushing stud 190 to a transformer tank, the first connector portion 220 of the stud 190 would be inserted through the hole in the tank so that the securing portion 230 is adjacent the outer casing or wall 270 of the transformer tank. The threaded securing member 210 would then be slipped over the first connector portion 220 from the inside of the tank until it engages the threads 200, and then the securing member 210 would be threaded on to the threads 200 until the outer face 330 of the securing member abuts the inner surface of the transformer tank, thereby locating the securing portion 230 on the outside of the tank. Needless to say, appropriate gasket materials, such as the sealing gasket 340 in FIG. 6, would also be used.

It should of course be appreciated that the securing means of the two embodiments described above may be interchanged or modified, with appropriate modification of the conductor, etc. Such variations or modifications are believed to be well within the expertise of one skilled in this art.

With regard to the particular conductive materials which may be used to fabricate the bushing stud of the present invention, it is believed that aluminum and copper are preferred materials, with such other materials as brass, steel, stainless steel, bronze, and tinned bronze also being usable. Although cold forming or upset forming the conductor from a single slug of material is a preferred manufacturing method because of such advantages as reasonable cost and little or no waste, other manufacturing methods are believed to be usable. For example, the conductor of the bushing assembly of the present invention might be formed by welding a plate to the middle of a rod. Thus a generally hexagonal annular plate could be welded near the center of a rod to form the conductor of the embodiment described in FIGS. 1 to 5 hereinabove. Also, it is believed that the conductor may be machined from bar or rod stock as necessary.

The insulating layer on the conductor may be made up of such materials as epoxies, polyesters, fiberglass reinforced materials, vinyls, polyurethanes, melamines, polyethylenes, nylons, and other thermoplastic and thermoset materials. However, it is necessary that this insulating layer be a relatively hard material that does not flow significantly under pressure from the clamped and tightened parts. In this regard, it has been found that an epoxy coating such as Corvel ECB-1363 manufactured by Polymer Corp. of Harrisburg, Pa., applied using a conventional fluidized bed coating method, provides satisfactory performance properties. Of course, almost any other dielectric material that can be used in a fluidized bed is believed to be potentially usable in coating the conductor, subject to the above-mentioned performance requirements.

Among the advantages of the present invention, in addition to those referred to above, are that it is considerably stronger than the epoxy molded bushings currently available in the market today, and likewise is of significantly lower cost based on the fact that aluminum or copper conductor cost per cubic inch is less than the cost of epoxy insulating compound per cubic inch. Thus, the present invention uses a maximum amount of conductor material to provide the required shape and physical strength, while the insulating coating is minimized and only has to provide the electrical insulating function. The device of the present invention is also relatively simple to install and furnishes a secure oil-tight seal on the transformer tank.

While it will be apparent that the preferred embodiments of the invention disclosed are well calculated to fulfill the objects above stated, it will be appreciated that the invention is susceptible to modification, variation, and change without departing from the proper scope or fair meaning of the subjoined claims.

What is claimed is:

1. A bushing assembly for use with a tank-type electrical transformer adapted to be inserted through an opening in the outer casing of the electrical transformer, said bushing assembly being comprised of a bushing stud and means for securing said stud to the transformer, said bushing stud comprising:

a first connector portion made of a conductive material and adapted for connection to an electrical lead within the transformer, a securing portion integral with and made of the same conductive material as said first connector portion, but of a larger diameter, said securing portion adapted to be mounted adjacent the outer casing of the electrical transformer, a second connector portion integral with and made of the same conductive material as said first connector portion and said securing portion, but of a smaller diameter than said securing portion, said second connector portion adapted for connection to an electrical lead outside the transformer, said securing portion having a relatively thin layer of insulating material thereon, and said means for securing said stud to the transformer comprising an externally mating clamp assembly having a central alignment hole for passing around said second connector portion, and a plurality of mounting holes therein adapted for alignment with studs on the outside of the transformer tank, and having insulating properties and being adapted for locating said securing portion on the outside of the tank adjacent the outer casing of the electrical transformer.

2. The invention of claim 1 wherein said first connector portion and said second connector portion are at least partially threaded.

3. The invention of claim 1 wherein said first connector portion and said second connector portion are generally symmetrical about said securing portion.

4. The invention of claim 1 wherein said clamp assembly comprises a metal stamping having a relatively thin layer of insulating material thereon and wherein said mounting holes in said clamp assembly are formed by brass eyelets.

5. The invention of claim 1 wherein a cushion gasket is used between said clamp assembly and said securing portion.

6. The invention of claim 1 wherein a sealing gasket is used between said securing portion and the outer casing of the electrical transformer.

7. The invention of claim 1 wherein said securing portion is generally hexagonal in cross-sectional shape, and wherein said mating clamp assembly is adapted to be placed over and mate with said securing portion.

8. The invention of claim 7 wherein said clamp assembly is generally triangular in cross-sectional shape so that the three side walls of said clamp assembly mate with three of the six sides of said hexagonal securing portion.

9. A bushing assembly for use with a tank-type electrical transformer adapted to be inserted through an opening in the outer casing of the electrical transformer, said bushing assembly being comprised of a bushing stud and means for securing said stud to the transformer, said bushing stud comprising:

a first connector portion made of a conductive material and adapted for connection to an electrical lead within the transformer, a securing portion integral with and made of the same conductive material as said first connector portion, but of a larger diameter, said securing portion adapted to be mounted on the outside of the tank adjacent the outer casing of the electrical transformer and having threads adjacent said securing portion extending through the opening in the casing into the inside of the tank, a second connector portion integral with and made of the same conductive material as said first connector portion and said securing portion, but of a smaller diameter than said securing portion, said second connector portion adapted for connection to an electrical lead outside the transformer, said securing portion having a relatively thin layer of insulating material thereon, and said means for securing said stud to the transformer comprising a threaded securing member having insulating properties and being adapted for locating said securing portion on the outside of the tank adjacent the outer casing of the electrical transformer, by engaging the threads adjacent said securing portion which extend into the inside of the tank.

10. The invention of claim 9 wherein said second connector portion includes a threaded hole adapted to receive matably threaded electrical connection means.

11. The invention of claim 9 wherein said securing member comprises a generally circular nut-like member.

12. The invention of claim 9 wherein said securing member is nonmetallic.

13. The invention of claim 12 wherein said securing member is made of a molded epoxy.

14. The invention of claim 12, wherein said composite securing flange is generally hex-shaped, said clamp member being a generally laterally-extending plate-like member of a generally triangular shape and having a wall portion extending generally longitudinally from each of the three sides thereof, said clamp member further being adapted to receive said generally hex-shaped composite securing flange between said wall portions with three of the sides of said composite securing flange aligned in a generally mating registry with the three sides of said clamp member and with the remaining three sides of said composite securing flange generally aligned with but laterally spaced from the apexes of said clamp member, said first three sides of said composite securing flange laterally interfering with the three sides of said clamp member when in said mating registry with one another to prevent said composite securing flange and said connector portions from rotating laterally relative to said clamp member, one of said attachment means for securing said clamp member to the casing being located generally between each of said remaining three sides of said composite securing flange and its associated apex of said clamp member.

15. A bushing assembly for use with an electrical transformer having a casing, said bushing assembly being adapted to protrude through an opening in the casing of the electrical transformer in order to provide electrical connection between electrical conductors on opposite sides of the casing, said bushing assembly comprising conductor means and clamping means for securing said conductor means to the transformer, said conductor means including first and second connector portions electrically integral with one another and composed of an electrically conductive material, said first and second connector portions being adapted for electrical connection to said electrical conductors on opposite sides of the casing of the electrical transformer, at least one of said first and second connector portions extending longitudinally through the opening in the casing of the electrical transformer, said conductor means further including a composite securing flange fixedly extending laterally from a generally intermediate location along said bushing assembly generally between said first and second connector portions, said composite securing flange including an electrically conductive inner member and a relatively thin outer coating of electrically insulating material following the contour of said inner member, said relatively thin outer coating of electrically insulating material being of a substantially uniform thickness and extending over a part of each of said connector portions generally adjacent said composite securing flange, said composite securing flange being generally plate-like in configuration with its longitudinal thickness being substantially less than the longitudinal length of said first and second conductors and with its lateral dimensions being substantially larger than the lateral dimensions of said first and second conductors, said composite securing flange further being adapted to be mounted generally adjacent the casing of the electrical transformer with said thin outer coating of electrically insulating material interposed between said inner member of said composite securing flange and said casing, said clamping means including a clamp member engageable with said conductor means and having an opening for receiving at least one of said first and second connector portions extending therethrough and attachment means for securing said clamp member to one side of the casing, said engagement between said clamp member and said conductor means biasing said composite securing flange toward said one side of the casing of the electrical transformer, said composite securing flange being generally hex-shaped, said clamp member being a generally laterally-extending plate-like member of a generally triangular shape and having a wall portion extending generally longitudinally from each of the three sides thereof, said clamp member further being adapted to receive said generally hex-shaped composite securing flange between said wall portions with three of the sides of said composite securing flange aligned in a generally mating registry with the three sides of said clamp member and with the remaining three sides of said composite securing flange generally aligned with but laterally shaped from the apexes of said clamp member, said first three sides of said composite securing flange laterally interfering with the three sides of said clamp member when in said mating registry with one another to prevent said composite securing flange and said connector portions from rotating laterally relative to said clamp member, one of said attachment means for securing said clamp member to the casing being located generally between each of said remaining three sides of said composite securing flange and its associated apex of said clamp member, said attachment means comprising a number of threaded fastener means mounted on said one side of the transformer casing, said composite securing flange having an aperture extending through each of said spaces between said three apexes of said clamp member and said remaining three sides of said composite securing flange, said apertures being aligned for receiving one of said fastener means extending through each of said apertures.

16. The invention of claim 15, wherein said clamp member also includes a relatively thin outer coating of electrically insulating material generally following its contour.

17. A bushing assembly for use with an electrical transformer having a casing said bushing assembly being adapted to protrude through an opening in the casing of the electrical transformer in order to provide electrical connection between electrical conductors on opposite sides of the casing, said bushing assembly comprising conductor means and clamping means for securing said conductor means to the transformer, said conductor means including first and second connector portions electrically integral with one another and composed of an electrically conductive material, said first and second connector portions being adapted for electrical connection to said electrical conductors on opposite sides of the casing of the electrical transformer, at least one of said first and second connector portions extending longitudinally through the opening in the casing of the electrical transformer, said conductor means further including a composite securing flange fixedly extending laterally from a generally intermediate location along said bushing assembly generally between said first and second connector portions, said composite securing flange including an electrically conductive inner member and a relatively thin outer coating of electrically insulating material following the contour of said inner member, said composite securing flange being generally plate-like in configuration with its longitudinal thickness being substantially less than the longitudinal length of said first and second conductors and with its lateral dimensions being substantially larger than the lateral dimensions of said first and second conductors, said composite securing flange further being adapted to be mounted generally adjacent the casing of the electrical transformer with said thin outer coating of electrically insulating material interposed between said inner member of said composite securing flange and said casing, said clamping means including a clamp member engageable with said conductor means and having an opening for receiving at least one of said first and second connector portions extending therethrough and attachment means for securing said clamp member to the casing, said engagement between said clamp member and said conductor means biasing said composite securing flange toward one side of the casing of the electrical transformer.

18. The invention of claim 17, wherein said composite securing flange is clamped between said clamp member and the casing of the electrical transformer when said clamp member is secured to the casing.

* * * * *

UNITED STATES PATENT AND TRADEMARK OFFICE

CERTIFICATE OF CORRECTION

PATENT NO. : 4,573,757

DATED : March 4, 1986

INVENTOR(S) : John P. Cochran, et al.

It is certified that error appears in the above-identified patent and that said Letters Patent is hereby corrected as shown below:

Column 4, line 19, "as" should be --an--.

Column 5, line 51, "adpated" should be --adapted--.

Column 9, line 39 (Claim 15), "shaped" should be --spaced--.

Signed and Sealed this

*Twenty-second* Day of *July 1986*

[SEAL]

*Attest:*

DONALD J. QUIGG

*Attesting Officer* *Commissioner of Patents and Trademarks*